United States Patent Office 3,520,769
Patented July 14, 1970

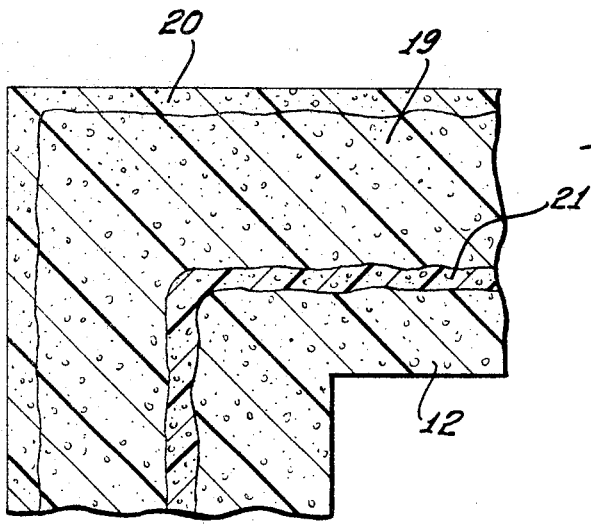
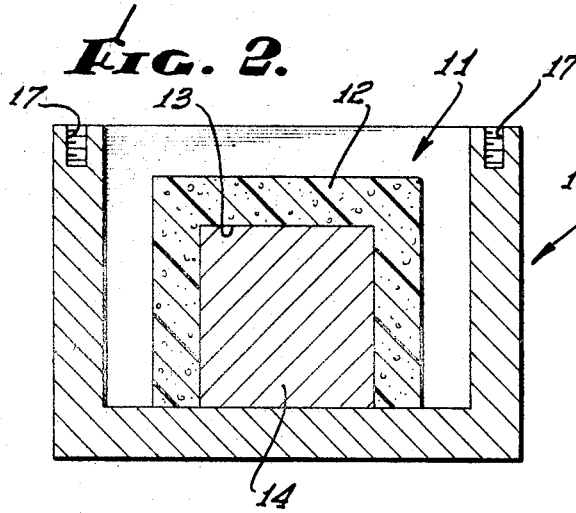
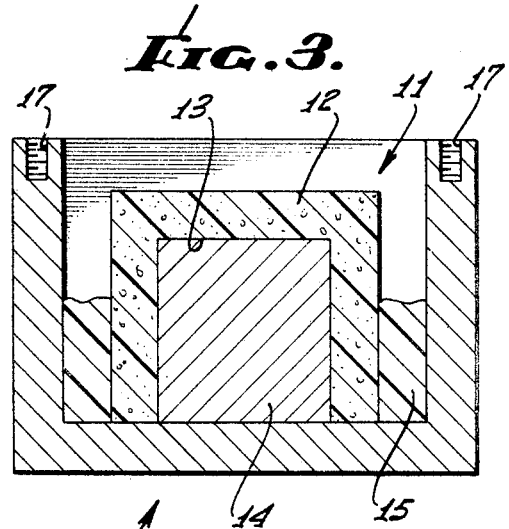
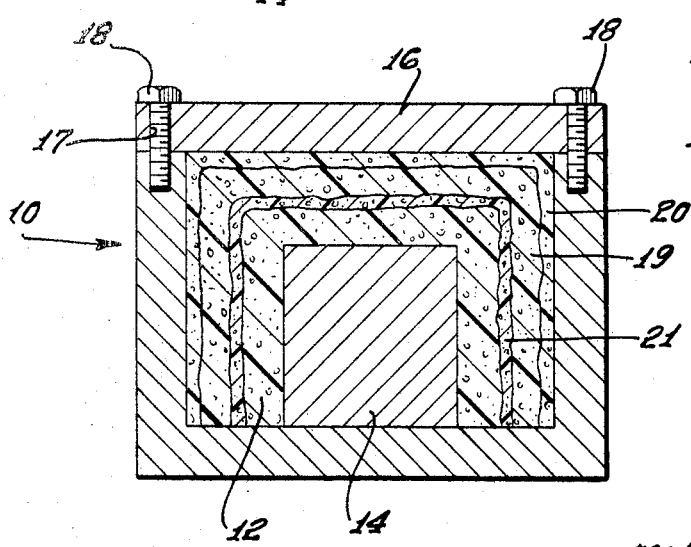

3,520,769
PACKAGING MATERIAL AND METHOD OF MAKING SAME
Bert Baker, Huntington Beach, Calif., assignor to Pacific Foam Packaging, Los Angeles, Calif., a corporation of California
Filed Apr. 9, 1968, Ser. No. 719,867
Int. Cl. B32b 3/26; B29d 27/04; B65d 85/00
U.S. Cl. 161—160                                    3 Claims

ABSTRACT OF THE DISCLOSURE

A light weight, integral, packaging material having an article-shaped inner cavity, an inner layer of cellular polystyrene, an intermediate layer of cellular polyurethane, and a smooth, hard outer layer of high density polyurethane. A method for making said packaging material by foaming polyurethane reactants in the presence of preformed cellular polystyrene whereby there is formed a bond between the polystyrene and the polyurethane, said bond forming a water-vapor and air impervious zone. At the same time there is formed a smooth, hard outer layer on the polyurethane which is dent-resistant.

BACKGROUND OF THE INVENTION

Cellular or expanded polystyrene is utilized, to a great extent, as a packaging material because it is light weight, is thermal-insulating, and provides a great deal of protection to any article contained in a package formed from such polystyrene. Moreover polystyrene is relatively strong. However, the surface of expanded polystyrene is fragile and will break easily, e.g. during the normal handling of packages.

Moreover, polystyrene is fairly porous, particularly to water vapor, and therefore articles contained within a polystyrene package are oftentimes corroded or ruined because of this fact. This is particularly true when the package is exposed to high humidity conditions.

In view of the above enumerated disadvantages, as well as others, in using polystyrene as a packaging material, it is not surprising that a great deal of experimentation has been conducted in an attempt to overcome these disadvantages. However, these attempts have not been successful. For example, those skilled in the art have attempted to form a hard skin on the polystyrene by applying a coating of certain materials on the surface of the polystyrene. However, no satisfactory material has yet been discovered which will offer any substantial protection to the polystyrene. I have also observed that, from an economic standpoint, it is impossible to bond a relatively hard material to the outer surface of the polystyrene. First because it is difficult to form a bond between polystyrene and a hard material and, even if a satisfactory bond could be achieved, the cost would be prohibitively high.

Moreover, even if polystyrene were provided with such a separate hard surface the problem of water vapor reaching an article contained in a polystyrene package would not be overcome.

SUMMARY OF THE INVENTION

The present invention is based on the surprising discovery that a foam packaging material can be produced in a very economical manner, said packaging material having a smooth outer layer which is relatively dent-resistant and will withstand the roughest type of handling. In addition, the foamed packaging material of this invention is light weight, thermal-insulating, and will protect any article contained therein from breaking due to rough handling and from the corroding effect of water vapor.

The exceptional and surprising characteristics of the article of this invention are obtained by providing a foamed packaging material having an article-shaped inner cavity which is formed from low density cellular polystyrene which is capable of cushioning and protecting an article contained in said cavity. Bonded to the polystyrene is cellular polyurethane; surprisingly the bond between the polystyrene and the polyurethane forms a water vapor and air impervious zone which protects the article from being contaminated by water vapor and/or contaminants in the air. The polyurethane has a smooth outer layer which is dent resistant and will not break under the roughest type of handling. This hard, smooth outer layer is formed by foaming the polyurethane under relatively high pressures, e.g. above 10 p.s.i. and preferably between 14 p.s.i. and 20 p.s.i.

It is thus an object of the present invention to embody a foam packaging material which is thermal-insulating, light weight and economically produced.

Another object of the invention is to disclose and provide a foam packaging composition which is impervious to water vapor, thereby completely protecting any article contained in said foamed packaging material from the deleterious effect of being contacted by water vapor or condensed water.

A further object of the invention is to embody and provide a foam packaging composition which will cushion an article from bumps and shocks due to rough handling and, at the same time, have a hard surface which will not break during such rough handling.

It is still a further object of the invention to provide a foamed integral packaging composition having an inner cushioning and protecting layer of polystyrene, an intermediate layer of cellular polyurethane bonded to the polystyrene to form a water vapor and air impervious zone, and a smooth outer layer of high density polyurethane.

Still another and further object is to provide and disclose a method for producing the said foam packaging material, said method allowing for the production of a foam packaging material which will withstand rough handling and which is water-impervious and thermal-insulating.

BRIEF DESCRIPTION OF THE DRAWING

FIG. 1 illustrates a section of the foamed packaging material of this invention.

FIG. 2 is a sectional view of a mold containing preformed polystyrene.

FIG. 3 is a sectional view similar to FIG. 2 in which a mixture of polystyrene foam-forming reactants is added in the space between the polystyrene and the walls of the mold.

FIG. 4 is a sectional view showing the foamed packaging material after it has been formed and still in the mold.

DESCRIPTION OF THE PREFERRED EMBODIMENTS

Referring now particularly to FIG. 2, I have illustrated a sectional view of a mold, indicated generally at 10, which may be utilized in forming the foamed packaging material of my invention. Contained within the cavity or hollow 11 of the mold is preformed low density polystyrene 12 which has an article-shaped cavity 13 which is filled with a support block 14 made of any desirable material such as steel, aluminum, wood or the like. This support block is necessary in order to prevent collapse of the preformed polystyrene during the foaming operation of the polyurethane which causes a great deal of pressure (greater than 10 p.s.i.) in the mold and accordingly also against the wall of the preformed cellular polystyrene.

In the preferred exemplary embodiment the mold 10 is made of steel but can be made of any material which will withstand pressures of 10 p.s.i. or higher. Other examples of such materials are cast iron and aluminum.

Prior to pouring the mixture of polyurethane foam-forming reactants into mold cavity 11, the mold walls are preferably heated above 70° F. and most preferably between 100° and 120° F. or higher. The mold walls can be heated in any manner desirable, for example, by an oven not shown. Heating the mold walls allows the formation of the polyurethane in a much more rapid manner and a more desirable hard outer layer is formed on the polyurethane (providing that a pressure of 10 p.s.i. or more is attained).

Polyurethane foam-forming reactants are known in the art and the present invention is not predicated upon the use of such reactants. Any of the known reactants can be utilized in the present invention to form the cellular polyurethane layer 19.

Urethane polymers contain the group —NHCOO— and are basically formed through the reaction of a diisocyanate and a glycol. In the production of urethane foams, as are utilized in this invention, excess isocyanate groups in the polymer react with water or carboxylic acids to produce carbon dioxide, blowing the foam, at the same time that cross-linking of the polymer is effected. It is sometimes necessary to add catalysts, such as tertiary amines to achieve rapid production of foam. Instead of utilizing water to form $CO_2$ as the foaming ingredient it is oftentimes, and in this invention preferable, to utilize low boiling inert liquids such as fluorocarbons. The use of fluorocarbon gas helps in obtaining a very low thermoconductivity final product because of the entrapped fluorocarbon gas.

As already implied above the production of foamed polyurethane requires basically two reactants: (1) a polyisocyanate and (2) a polyhydric alcohol, or a polyether or polyester which contains terminal hydroxyl groups.

Examples of organic polyisocyanates useful in the present invention are aryl isocyanates such as m-phenylene-diisocyanate; p-phenylene diisocyanate; p,p'-diphenyl diisocyanate; diphenyl-3,3'-dimethyl-4,4'-diisocyanate; diphenyl-3,3'-dimethoxy-4,4'-diisocyanate; 1,5-naphthylene-diisocyanate; and diphenyl-3,3'-dichloro-4,4'-diisocyanate.

Also cycloalkane isocyanates such as cyclohexane 1,4-diisocyanate; cyclopentane-1,3-diisocyanate; and cyclohexane-1,2-diisocyanate are useful to form the cellular polyurethane layer of this invention.

The polyethers of this invention which are useful in forming the cellular polyurethane can be represented by the formula $HO(RO)_nH$ in which R is an aliphatic radical and preferably a divalent lower alkylene radical, and $n$ is a positive integer; preferably the value of $n$ is such that the molecular weight of the polyether is between 900 and 6000.

Polyesters usable in the present invention as reactants to form the polyurethane are polyesters derived from reacting a dibasic acid such as adipic acid or a dibasic acid anhydride such as phthalic anhydride with a glycol such as diethylene glycol. Many other suitable organic compounds containing terminal hydroxyl groups could be mentioned; however, since these are well known in the art they will not be enumerated herein.

Preferably before the polyurethane reactants 15 are poured into the mold 10 the mold is heated to a temperature of above 70° F. and preferably 120° F. Thereafter the polyurethane reactants are poured into the mold and the mold top 16 is securely fastened to the top of the mold in any suitable manner such as by means of bolt holes 17 and bolts 18. The polyurethane reactants utilized in the presently preferred embodiment consist of Freon 11 ($CCl_3F$), as a blowing agent, toluene diisocyanate, and "Polylite" a trademark for an alkyd resin dissolved in styrene.

Preferably the reactants are mixed just prior to pouring them into mold cavity 11. Generally, the blowing agent (Freon 11) and the alkyd resin are premixed and this premixture is then mixed with the toluene diisocyanate. Immediately after mixing the reactants are added to mold cavity 11 and mold top 16 is placed over the top to have a confined space.

The reactants are then allowed to foam and react to form a cellular polyurethane layer 19 which forms a bond 21 with the polystyrene 12, said bond forming a water vapor and air impervious zone. Due to the pressure created during the reaction there is also formed an outer layer 20 on the polyurethane immediately adjacent the walls of the mold 11, said layer being hard, smooth, dent-resistant, and very dense (e.g. from 3 to 15 times as dense as the cellular polyurethane layer 19).

It has been found sometimes to be desirable to place a fiber mesh such as a wire mesh, a mesh composed of nylon fibers, or a mesh composed of Fiberglas, adjacent to the walls of the mold 10 prior to foaming the polyurethane. When the polyurethane is foamed the outer layer thereof impregnates the fiber mesh thus reinforcing the hard outside layer 20. Generally, however, there is no need to reinforce the outside layer because it is sufficiently hard and dent-resistant for most purposes.

The finished article, after being removed from the mold, is somewhat diametrically shown in cross section in FIG. 1. As can be seen more clearly in FIG. 1 the hard outside layer is not of even thickness, varying from ⅛ to ¼ of an inch. This variation is due to the fact that there are unequal pressures generated in the mold during the foaming operation which in turn varies the thickness of the hard outer layer to some extent.

Similarly, the bond 21 formed between the cellular polyurethane and cellular polystyrene is not completely uniform. Nevertheless, this bond does form a water vapor and air impervious zone. For example, the water vapor transmission rate of a packaging material made in accordance with this invention is from 2.0–0.9 (perm inch).

To form a complete package a top is provided made of the same material, i.e. an inner layer of cellular polystyrene, an intermediate layer of polyurethane, and a smooth outer layer of high density polyurethane. This top can be attached to the container in any convenient manner, such as by an epoxy resin. In order to render the container air tight and impervious to water vapor it is desirable to utilize a gasket made of rubber or the like.

While I have described this invention with respect to certain specific embodiments and applications, it is understood that various modifications may be made thereof without departing from the spirit and scope of the invention as claimed hereinafter.

I claim:

1. A light weight, integral, foamed packaging material comprising:
   an inner protecting and cushioning layer, consisting essentially of cellular, low density, resilient polystyrene;
   an intermediate layer consisting essentially of foamed, low density, cellular polyurethane integrally and chemically bonded to the polystyrene, said bond forming a water vapor and air impervious zone; and
   a smooth outer layer consisting essentially of high density, dent-resistant, non-porous polyurethane, said outer layer being an integral part of said low density polyurethane.

2. A packaging material according to claim 1 wherein said material has an inner article-shaped cavity formed by said inner layer of polystyrene, the polystyrene being capable of cushioning and protecting an article contained in said cavity.

3. A method for preparing a foamed packaging material having an inner article-shaped cavity comprising:

(1) providing a mold having a receptacle-shaped cavity with vertical side walls and a bottom wall, said cavity containing a preformed, cellular, low density polystyrene having an article-shaped cavity, the preformed polystyrene being spaced from the vertical side walls of said mold;

(2) pouring into the mold containing the preformed polystyrene a mixture of polyurethane foam-forming reactants and thereafter placing a cover over the receptacle-shaped cavity of said mold thereby forming a confined space;

(3) allowing the mixture of polyurethane foam-forming reactants to foam and fill the confined space, the pressure formed during such foaming being at least 10 p.s.i., and maintaining the temperature of the reaction above 70° F., whereby there is formed a bond between the polyurethane and polystyrene, said bond forming a water vapor and air impervious zone, and, at the same time, a dense, non-porous, dent-resistant, hard skin on the polyurethane immediately adjacent to the walls of said mold; and (4) removing the thus formed foamed packaging material from the mold.

References Cited

UNITED STATES PATENTS 3,029,172   4/1962   Glass _____ 161—160

WILLIAM J. VAN BALEN, Primary Examiner

U.S. Cl. X.R.

161—161; 206—46; 264—46